United States Patent
Martino

(10) Patent No.: US 8,298,479 B2
(45) Date of Patent: *Oct. 30, 2012

(54) MACHINED TITANIUM CONNECTING ROD AND PROCESS

(76) Inventor: Gerald Martino, Mt. Pleasant, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/068,486

(22) Filed: May 12, 2011

(65) Prior Publication Data

US 2011/0214529 A1 Sep. 8, 2011

Related U.S. Application Data

(63) Continuation-in-part of application No. 12/215,021, filed on Jun. 24, 2008, now Pat. No. 7,985,371.

(51) Int. Cl.
 *B22F 3/12* (2006.01)
 *B21D 53/84* (2006.01)
(52) U.S. Cl. ............... 419/28; 419/12; 419/13; 419/14; 419/18; 419/19; 419/23; 419/38; 29/888.09
(58) Field of Classification Search .............. 75/245; 419/12–14, 18, 19, 23, 28, 38; 29/888.09
See application file for complete search history.

(56) References Cited

U.S. PATENT DOCUMENTS

| | | | |
|---|---|---|---|
| 4,810,465 A * | 3/1989 | Kimura et al. | 420/417 |
| 4,970,783 A * | 11/1990 | Olaniran et al. | 29/888.09 |
| 5,353,500 A * | 10/1994 | Hoag et al. | 29/888.091 |
| 6,197,252 B1 * | 3/2001 | Bishop et al. | 419/36 |
| 6,607,693 B1 * | 8/2003 | Saito et al. | 420/417 |
| 6,635,098 B2 * | 10/2003 | Abkowitz et al. | 75/245 |
| 7,806,243 B2 * | 10/2010 | Martino | 188/218 XL |
| 2004/0013558 A1 * | 1/2004 | Kondoh et al. | 419/36 |
| 2005/0072496 A1 * | 4/2005 | Hwang et al. | 148/421 |
| 2005/0262962 A1 * | 12/2005 | Cagney et al. | 74/579 R |
| 2007/0256300 A1 * | 11/2007 | Okumura et al. | 29/888.09 |
| 2010/0028190 A1 * | 2/2010 | Wang | 419/6 |

* cited by examiner

*Primary Examiner* — Roy King
*Assistant Examiner* — Ngoclan T Mai
(74) *Attorney, Agent, or Firm* — Gary P. Topolosky

(57) ABSTRACT

A process for forming a remateable machined titanium powder base alloy connecting rod using a titanium alloy powder having an average particle size of about 1-20 microns, a mean aspect ratio of about 5 to 300, and a specific surface area of at least about 25 m²/g.

13 Claims, 5 Drawing Sheets

MACHINED TITANIUM CONNECTING ROD AND PROCESS

CROSS-REFERENCE TO RELATED APPLICATION

This application is a continuation-in-part of U.S. Ser. No. 12/215,021, filed on Jun. 24, 2008, the disclosure of which is fully incorporated herein.

BACKGROUND OF THE INVENTION

This invention relates to a titanium member and particularly to titanium members formed from titanium powders. More particularly, it relates to titanium alloy members such as internal combustion engine connecting rods and caps therefore. Further, the invention relates to the production of connecting rods having split bearing assemblies and matched mating surfaces at the large bore or circumferential opposite ends.

Connecting rods have three parts, namely, a small end or terminal portion with a small bearing hole, a large end with a large bearing opening and a rod portion connecting the small bearing to the large bearing. Most connecting rods are comprised of two members including a semi-circular end cap which forms approximately half the large bearing opening. The end cap is fastened to a mating surface formed as part of the connecting rod. The small end is an integral part of the connecting rod. The end cap is required to fit the connecting rod to the crank of the internal combustion engine. For some applications, the large end is comprised of an integrally formed, large bearing opening similar to the small end.

Conventionally, the connecting rod was fabricated in two parts comprised of the end cap and connecting rod. However, considerable difficulty was experienced in precisely mating the end cap to the connecting rod to form the large bearing opening. To overcome the problem of matching the end cap to the mating surface, the end cap is forged against or cracked from the large bearing surface utilizing crack initiating indents to promote a cracking plane to provide an exactly remateable end cap surface. For example, U.S. Pat. No. 5,566,449 discloses a connecting rod as a shaft clamping member and includes a rod member and cap, each of which has mating faces at circumferentially opposite ends of a semi-circular recess and which are fastened to each other by bolts by matching the opposed mating faces to each other to define a crank pin hole by the two semi-circular recesses. The rod member and cap are forgings formed from a titanium alloy and simultaneously produced by forging powder preforms of the rod member and cap in a cavity having the desired shape of the connecting rod. After forging, the opposed mating faces have an infinite number of recesses and projections which are formed from the flow of the material during the forging and which are in a matched and fitted relation to each other.

U.S. Pat. Nos. 5,353,500, 5,131,577, 5,109,605, 5,105,538, 4,993,134 and 4,936,163 disclose a method of making a connecting rod for attachment to a bearing journal by separation of parts of the connecting rod, including: (a) forging a powder metal sintered preform to provide a one-piece connecting rod having an annular wall defining a crank opening with a center axis and with stress risers for establishing a cracking plane that extends across the crank opening; (b) providing access for a compression coupling across the cracking plane; (c) while at ambient conditions, applying tension substantially uniformly across the cracking plane to propagate fracture from the stress risers along the cracking plane and thereby separate the connecting rod into a cap and body with cracked surfaces; and (d) remating the cap and body by applying a compression coupling through the access to draw the cap and body together under guidance and with metal yielding pressure to effect substantially an exact rematch of the cracked surfaces. Control of the diametrical clearance between the bolt shanks and the bolt openings, of the bolts used as the compression coupling, promotes guidance needed to achieve such rematch. The cracking is effected in an improved manner by use of continuous pulling apart of the rod in a direction perpendicular to the cracking plane.

U.S. Pat. No. 4,860,419 discloses a method for making split bearing connecting rods, including steps wherein previously clamped body and cap portions are quickly forced apart longitudinally to cause fracture separation of both pairs of integral legs in a single motion while the cap and body are restrained from substantial relative rotation by a clamp of a fracture separation apparatus.

U.S. Pat. No. 4,569,109 discloses split bearing assemblies having separable bearing caps for both single applications, such as connecting rods, and multiple applications, such as engine crankshaft supports, together with methods and apparatus for making such assemblies by integrally forming the caps with the main body and separating them by fracture separation. A two-step separation method is disclosed with bore starter notches and semicircular die expanders that minimize split plane and bore distortion.

U.S. Pat. No. 5,051,232 discloses that separation of two or more forged powder metal components can be facilitated by forming a compacted and sintered powder metal preform with at least one slit that separates the component pieces. An anti-bonding agent such as graphite is introduced into the slit and the preform is then forged to final shape. The anti-bonding agent prevents the complete bonding of the powder metal pieces to each other thereby facilitating separation of the pieces at the slit. This method is particularly suited for the manufacture of piston connecting rod assemblies of the type including a connecting rod and cap.

U.S. Pat. No. 5,722,036 discloses a manufacturing process for a sintered connecting rod assembly comprising a first member with a projection and a second member with a concavity in which the first member and the second member are mated with each other by engaging the projection with the concavity. A powdered raw material is compacted into a first compact and a second compact for the first and second members, wherein the projection of the first compact has a width slightly larger than the width of the concavity of the second compact. The projection of first compact is then engaged with the concavity of the second compact to mate the first compact with the second compact, thereby the projection and the concavity are tightly pressed against each other. After sintering the mated first and second compacts, they are forced to release the projection from the concavity. The die for compacting the raw material has a whole cavity and a removable core for dividing the whole cavity into two cavities.

U.S. Pat. No. 3,994,054 discloses the crankshaft bearing cap of a connecting rod formed from a forged rod blank which includes an integral circular head having an internal bearing surface and have integrally formed interconnecting lug portions. The lug portions are provided with cracking openings aligned with and parallel to a cracking plane. Each of the openings is provided with a cracking notch or recess which extends downwardly from one side of the head between twenty and fifty percent of the opening length. The assembly is located on a lubricated supporting bed with the unnotched face resting on the supporting surface. Interconnected cracking pins with a suitable tapered configuration are simultaneously forced into the cracking holes with an impact type force. The tapered pins are interconnected to a common support equalizing the cracking impact pressure as the pins are moved into cracking openings. Each of the notches is formed with a V-shape with an inclusive angle of forty-five degrees and a relatively shallow depth of from 0.010 to 0.020 inches to define a sharp apex in the cracking plane. Suitably sized and circumferentially spaced radial lubrication holes in the cap provide improved lubrication and simplify the manufacturing process. The lubrication holes are spaced in accordance with the spacing of the needle roller bearings such that only one roller bearing is in aligned overlying relationship with each lubrication hole at any given instant.

U.S. Pat. No. 4,693,139 discloses that the bearing half and bearing cap are integrally connected together by bolts, chamfers are made in the peripheral portions of the bearing half and the bearing cap facing their broken and divided surfaces. Such chamfers are made before the dividing of the larger diameter end portion and thus cause the breaking and dividing operation to be facilitated.

U.S. Pat. No. 4,836,044 discloses that a multi-piece connecting rod has the large eye end formed with a yoke receiving a bearing bracket supported on an angled wedge surface by an angled counter surface of a wedge. The wedge is carried by a pin-like bolt between legs of the yoke and includes a threaded portion engaged by the bolt for tightening the angled wedge surfaces to clamp the bearing bracket in position.

U.S. Pat. No. 5,594,187 discloses an apertured connecting rod having a stress riser crease formed in one side thrust surface made by forging a powder metal sintered preform with a V-shaped notch mold formed in a side face whereby the spaced surfaces defining the V-shaped notch are folded inwardly toward one another during forging to create a deep crease without any substantial width.

In spite of these disclosures, there is still a great need for a machined titanium alloy based, connecting rod having improved properties and machined mating surfaces to provide exactly remateable end cap surfaces which can be fastened to form the large bearing opening in the connecting rod.

SUMMARY OF THE INVENTION

It is an object of the invention to provide an improved titanium powder base alloy connecting rod for an internal combustion engine.

It is still another object of the invention to provide a titanium powder base alloy for forming into articles or members such as machined, connecting rods.

Yet it is another object of the invention to provide a process for forming a titanium powder base alloy into connecting rods for internal combustion engines.

These and other objects will become apparent from a reading of the specification and claims appended hereto.

In accordance with these objects, there is provided a process of forming a remateable, machined connecting rod from a titanium powder base alloy. The process comprises the steps of providing a mold for a connecting rod, the mold defining a connecting rod having a large bore therein for use as a large bearing and a small bore for use as a small bearing, the bores connected by an arm member. A powder comprised of a titanium powder base alloy is provided in the mold. The powder is compressed to form a preform and then sintered to form a connecting rod. Preferably, a cap portion is machined along a machine plane in a wall defining the large bore to provide a cap portion having machined surfaces which permit substantially exactly rematching for securing the large bearing to a bearing surface of an engine crank.

The process of the invention includes steps of mixing particles of titanium or a titanium alloy with a nonmetallic material to form a mixture, compressing the mixture to form a preform, and sintering the preform at an elevated temperature to form an engine component such as a connecting rod. Titanium powder may contain some impurities, principally about 0.12 wt % titanium dioxide. The titanium powder has a median particle size of about 1-100 microns, preferably about 3-30 microns and more preferably about 5-10 microns. Particle surface area is greater than about 25 $m^2/g$ preferably about 50-250 $m^2/g$. Aspect ratio is about 5 to 300. Suitable titanium alloys include, for example, Ti-6Al-4V, Ti-6Al-6V-2Sn, Ti-6Al-2Sn-4Zr-2Mo, Ti-10V-2Fe-3Al, and Ti-5Al-2.5Sn.

The mixture contains about 30-95 parts by weight titanium or titanium alloy and about 5-70 parts by weight of the nonmetallic material. Preferably, the mixture contains about 60-80 parts by weight titanium or titanium alloy and about 20-40 parts by weight nonmetallic material. The nonmetallic material can be provided as particles, fibers, whiskers, flakes, or mixtures thereof. Suitable nonmetallic materials are ceramics including silicon carbide, boron carbide, tungsten carbide, chromium carbide, alumina., zirconium oxide, silicon nitride, boron nitride, and titanium diboride, solely or in various combinations with each other. Optionally, the mixture may contain up to about 10 parts by weight of an organic binder, as explained below in more detail. The ingredients are preferably mixed together by milling such as jet milling. A particularly preferred mixture contains about 70 parts by weight titanium powder and about 30 parts by weight silicon carbide powder. Optionally, up to about 10 parts by weight boron nitride may also be included.

Optional ingredients in the mixture include up to about 10 parts by weight of an organic binder and up to about 20 parts by weight boron nitride. The organic binder improves green strength before the titanium-containing mixture is sintered. Sintering converts the organic binder to metal carbides, water, and carbon dioxide. Selection of an appropriate binder requires that any organic content remaining in the product not affect performance, even at MOT (maximum operating temperature).

In addition, there is provided a process for making an improved titanium connecting rod. The process comprises providing titanium or titanium alloy powder having, for example, an average particle size of about 1-100 microns, a mean aspect ration of about 5 to 300, and specific surface area of at least about 25 $m^2/g$. Further, the process includes mixing a titanium or titanium alloy powder with a nonmetallic material to provide a mixture. A connecting rod mold is provided and said mixture is poured into the mold. The powder in the mold is compressed to form a preformed connecting rod or green body, and the preform is sintered to provide a connecting rod.

The mixture can contain 5-40 wt. % nonmetallic powder. The nonmetallic powder is comprised of at least one of the group consisting of silicon carbide, boron carbide, tungsten carbide, chromium carbide, alumina., zirconium oxide, silicon nitride, boron nitride, and titanium diboride, solely or in various combinations with each other.

The preferred nonmetallic powder is silicon carbide. The sintering step can be carried out in a temperature range of 1400° to 2200° F., preferably in the range of 1500° to 2100° F. The sintering step may be carried out utilizing microwaves or conventional radiation-conduction-convection heating. In the microwave process, the heat is generated internally within the material instead of originating from external heating sources. That results in rapid heating and shorter heating cycles with less energy requirements as compared to conventional heating methods. Microwaves are electromagnetic radiation with wavelengths ranging from 1 mm to 1 m in free space and frequency between 0.3 GHz to 300 GHz. Typical frequencies for materials processing are 0.915 GHz, 2.45 GHz, 5.8 GHz, and 24.124 GHz with 2.45 GHz as the standard for industrial and scientific applications. The connecting rod is densified to at least 50-75% after sintering, preferably to 95-100%.

The inventive process for making a connecting rod further comprises providing titanium powder having, for example, an average particle size of about 1-20 microns, a mean aspect ratio of about 5 to 300, and specific surface area of at least about 25 $m^2/g$. The process may include mixing the metallic powder with about 5 to 70 wt. % of a nonmetallic material to provide a mixture. A connecting rod mold is provided, and the mixture is poured into the mold. The powder in the mold is compressed to form a preformed connecting rod, and the preform is sintered to provide a connecting rod.

Further, the invention includes a process for making an improved titanium connecting rod. The process comprises providing titanium or a titanium alloy powder having, for example, an average particle size of about 1-20 microns, a mean aspect ratio of about 5 to 300, and specific surface area of at least about 25 $m^2/g$. Further, the process may include mixing a titanium or titanium alloy powder with 5 to 60 wt. % of a silicon carbide powder or material to provide a mixture. A connecting rod mold is provided, and the mixture is poured into the mold. The powder in the mold is compressed to form a preformed connecting rod, and the preform is sintered to provide a connecting rod.

DETAILED DESCRIPTION OF PREFERRED EMBODIMENTS

Figure 1:
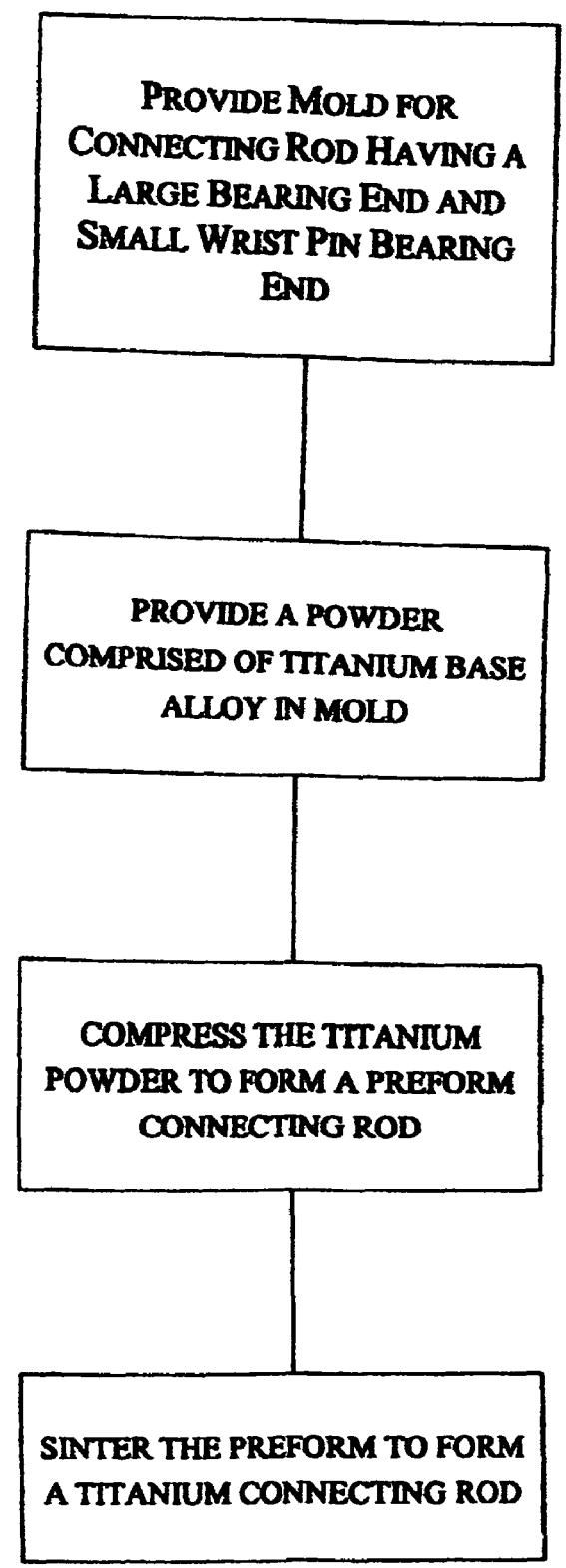
FIG. 1 is a flow chart showing steps in the process of the invention.

Referring now to FIG. 1, there is shown a flow chart illustrating steps which may be used in the invention. In FIG. 1, it will be seen that a body of titanium powder base alloy powder is provided for forming into a connecting rod.

Referring again to FIG. 1, it will be seen that after having obtained the titanium powder base alloy powder, a mold the shape of the desired connecting rod is provided. The titanium powder base alloy is provided in the mold and the powder is compressed in the mold to form a preform of the connecting rod. The preform is sintered. Thereafter, a cap is machined along a machining plane in a wall defining a bore suitable as a bearing surface in the large end to provide a remateable cap having substantially identical rematchable, machined surfaces. As shown in the accompanying figures, the remateable surfaces are commonly zigzagged. It should be understood, however, that other remateable machine surfaces may be substituted for same. The cap is used to secure the large end bearing of the connecting rod to a bearing surface of an engine crank, as further described herein.

Connecting rods in accordance with the invention can be used with or without shell-bearing sleeves in the large end bore.

Figure 2:
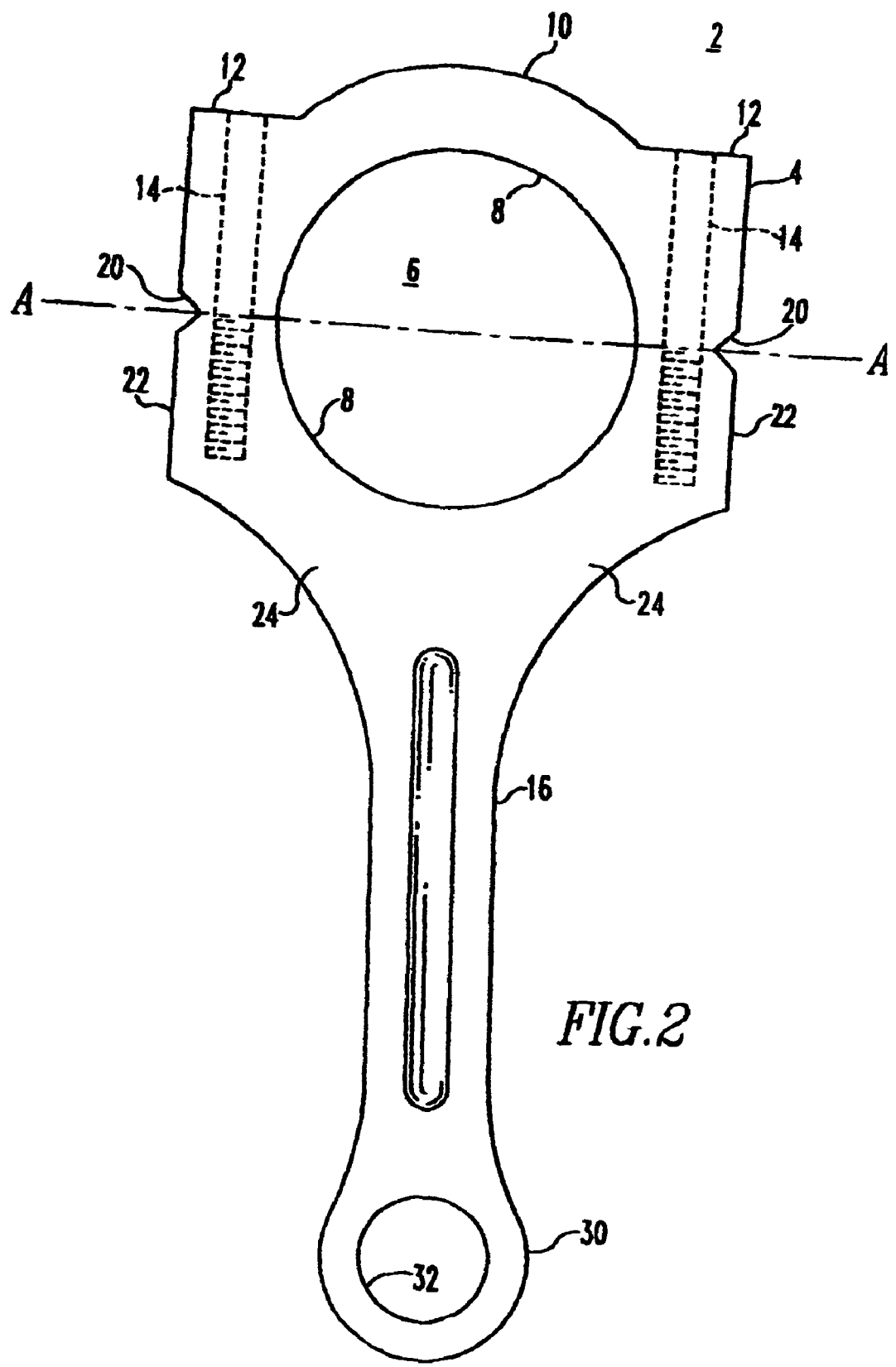
FIG. 2 is a plan view of a titanium powder base alloy connecting rod manufactured in accordance with the process of the invention.

A connecting rod 2 in accordance with the invention is shown in FIG. 2. Connecting rod 2 comprises a large end 4 having a bore 6 defined by wall 8. Further, large end 4 comprises a cap portion 10 having shoulders 12. Shoulders 12 are provided for drilling and tapping to provide openings 14 (shown in outline form) for bolts to secure cap portion 10 to arm member 16 after cap portion 10 is removed by fracturing. Crevices or notches 20 in wall 22 are provided for purposes of providing a machine plane A-A across bore 6. Connecting rod 2 further comprises arm member 16 which extends from lower portion 24 (below machine plane A-A) to small end 30 comprising small bore 32 suitable for a wrist pin and bearing utilized for securing to a piston of an internal combustion engine.

It will be noted that crevices or notches 20 may be formed in large end 4 when the rod is cast. Herein, it is preferred that such crevices or notches be machined in after casting for substantially exact fitting into one another. For connecting rods made from steel, fracturing is sufficient and more predictable. But for connecting rods made of titanium according to the present invention, fracturing is less preferred than machined plane parts due to the reduced predictability of titanium, generally speaking. Further, crevices or notches 20 are illustrative and can take away form in wall 8.

Figure 3:
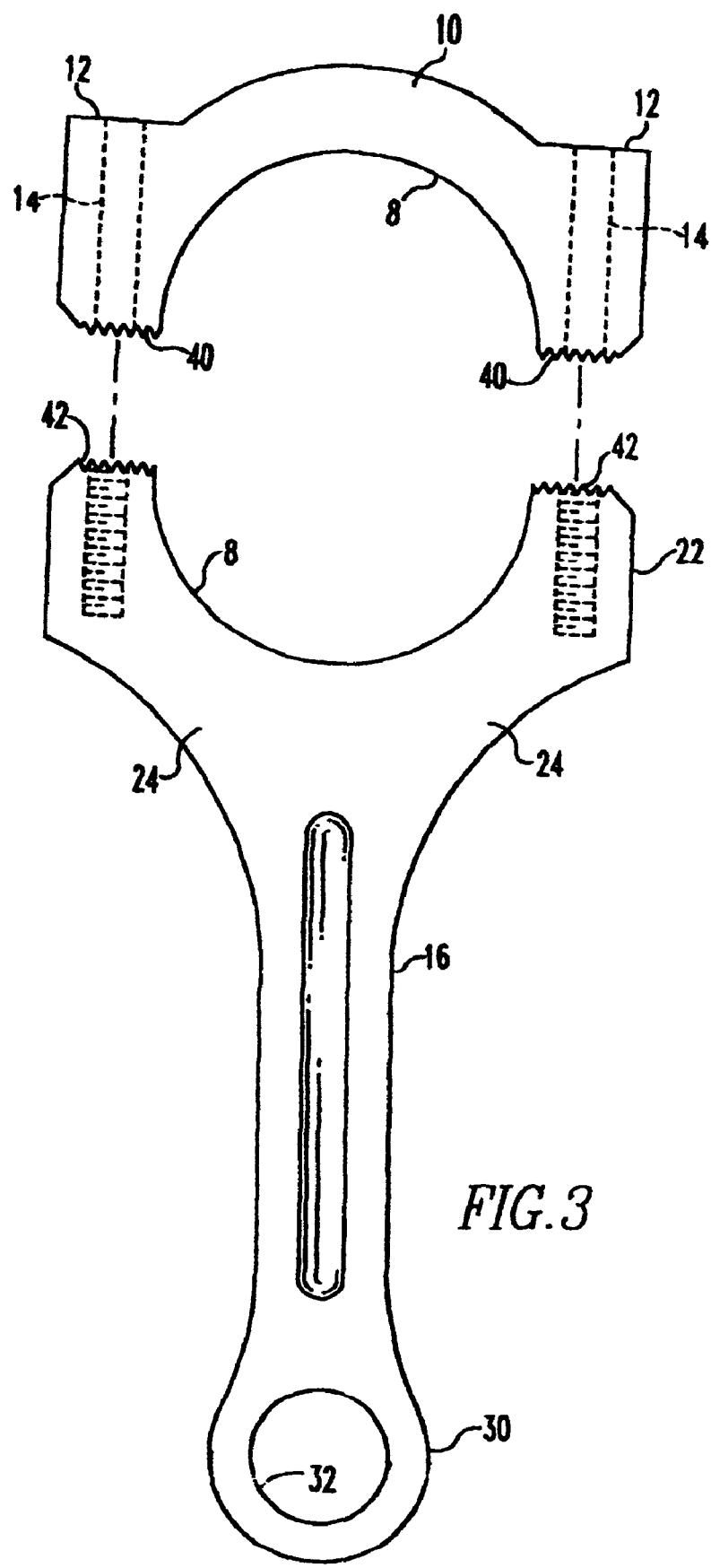
FIG. 3 is a plan view showing the large end portion of the connecting rod after machining a cap portion from the large bore to provide substantially identical remateable, machined surfaces.
Figure 4:
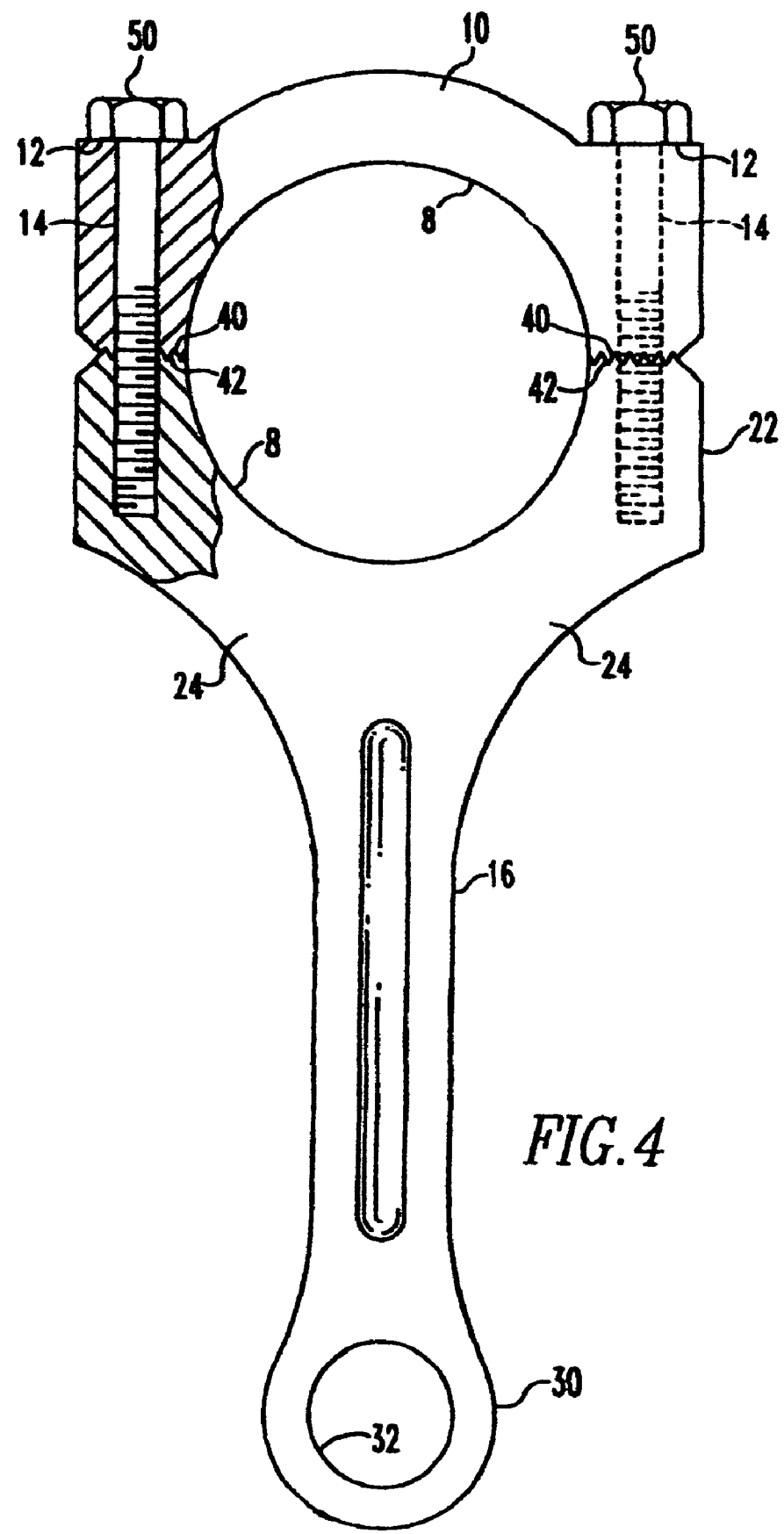
FIG. 4 is a plan view showing the large end portion of the connecting rod showing the cap portion bolted to the connecting rod after being machined across the machine or machining plane.

Holes or openings 14 may be drilled and the portion of bore 14 in wall 8 below machine plane A-A tapped or threaded to receive bolts to secure cap portion 10 after machining. Further, cap portion 10 is machined across its plane A-A to separate cap portion 10 from arm or member 16, as shown in FIG. 3. Machining provides for improved remateable surfaces 40 and 42, i.e., even better than fractured surfaces, since the former are substantially exactly remateable, having complementary peaks and recesses which permit the refastening of cap portion 10 to arm member 16 by bolts to provide the position or relationship of cap portion 10 to arm member 16 substantially the same as before machining. FIG. 4 shows cap portion 10 and arm member 16 reassembled and fastened together using bolts 50.

Machining of cap portion 10 can be made to occur in any manner that provides remateable surfaces 40 and 42. Apparatus and procedures for machining cap portion 10 across plane A-A are disclosed in U.S. Pat. Nos. 5,105,538, 4,936,163, 4,860,419 and 4,569,109).

Connecting rods in accordance with the invention have improved tensile strength compared to the same alloy provided by conventional casting. That is, fabricating a connecting rod as described with respect to the invention can improve the tensile strength by 50 to 100%, depending on the alloy used. For example, tensile strengths of 40 to 50 KSI and yield strengths of 35 to 48 KSI are attainable. Comparable strengths for the same alloy provided by conventional casting ranges from 20 to 35 KSI.

Figure 5:
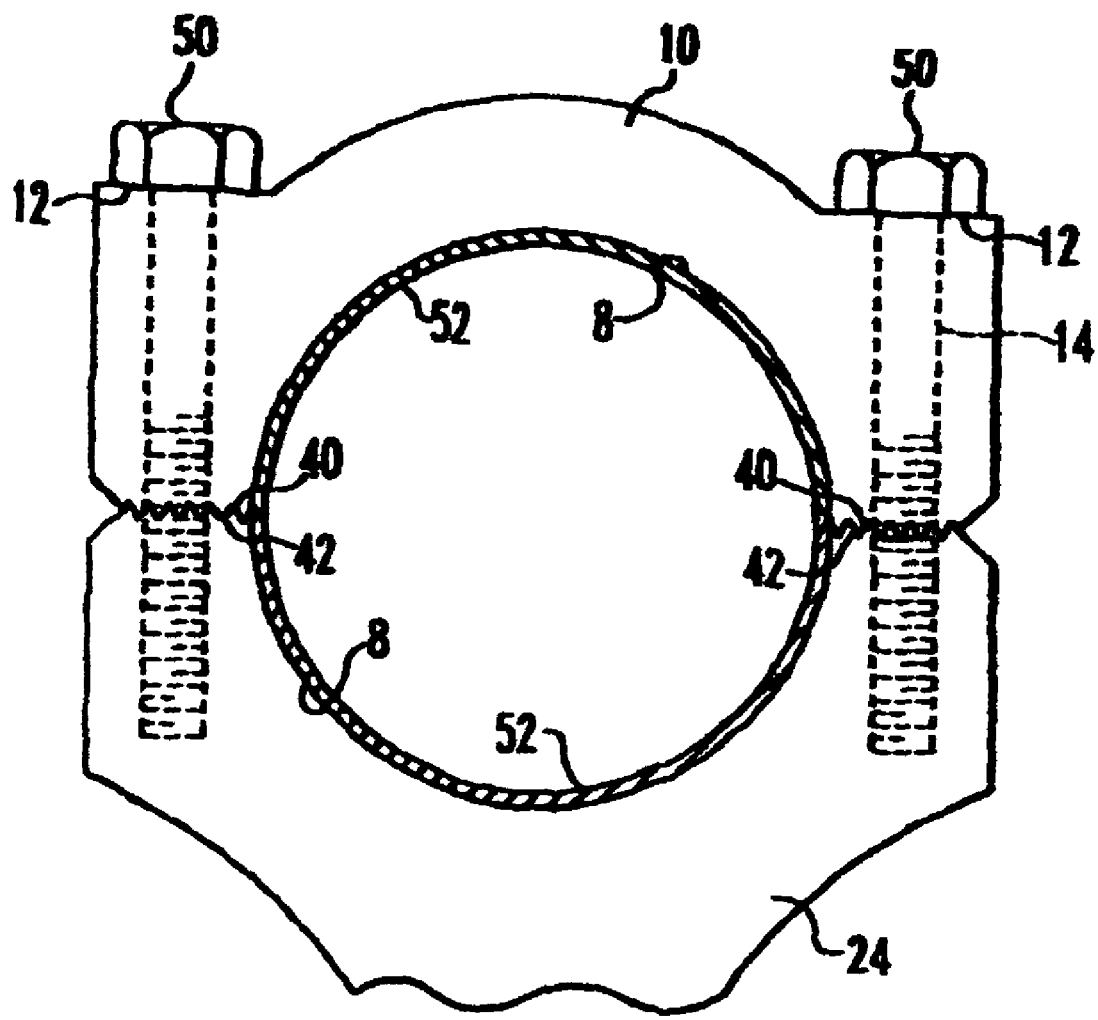
FIG. 5 is a plan view of a large bore illustrating the use of shell bearing when the cap portion is reconnected to the connecting rod.

It should be noted that connecting rods fabricated in accordance with the invention can be used with or without shell-bearing sleeves. If used without shell-bearing sleeves, the large end bore defined by wall 8 is machined to the required size or diameter for use with an engine crank. Shell bearing sleeves 52 are shown in FIG. 5 which is a partial view of the connecting rod showing its large end bore. Typically, shell-bearing sleeves 52 are semi-circular and extend from one fracture surface to the opposite fracture surface and are anchored in the bore to prevent turning during rotation of the crank.

In accordance with my invention, about 20 parts by weight titanium diboride powder were mixed with about 80 parts by weight titanium powder having less than 1 wt % impurities. The principal impurity in the titanium powder was titanium oxide comprising about 0.12 wt % of the powder. The titanium powder was supplied by International Titanium Powder, L.L.C. of Lockport, Ill. Processes for making the titanium powder are described in Armstrong et al. U.S. Pat. Nos. 5,779,761, 5,958,106 and 6,409,797. The Armstrong et al. patents are assigned to International Titanium Powder and their disclosures are incorporated herein by reference to the extent consistent with the present invention. The titanium powder has an aspect ratio of about 15 and specific surface area of about 100 m$^2$/g. Its median particle size is about 5-10 microns although the particles tend to clump together into larger agglomerates. The titanium and titanium diboride powders were blended with about 1 wt % of an organic binder, isostatically pressed at room temperature into the shape of a connecting rod, sintered at an elevated temperature, and cooled overnight to ambient temperature.

Typical alloys for the titanium are Ti-6Al-4V, Ti-6Al-6V-2Sn, Ti-6Al-2Sn-4Zr-2Mo, Ti-10V-2Fe-3Al, and Ti-5Al-2.5Sn.

Metal powder such as titanium powder useful in the invention preferably has a particle size in the range of about 1-20 μm, a mean weight ratio of about 5-300 and a surface area in the range of 5 to 150 m$^2$/g, typically about 25 m$^2$/g.

Typically, the mixture of metallic, e.g., titanium, and non-metallic, e.g., silicon carbide, particles comprises 5-60 wt. nonmetallic material, although in some instances the range for nonmetallic material may extend beyond this range. For purposes of sintering, this step may be carried out in a temperature range of 1400° to 2200° F., typically 1500° to 2100° F. As an example, heat may be supplied using microwaves generated in a 2.45 GHz multimode microwave furnace, which consists of a furnace chamber with vacuum capability, a microwave mode stirrer that breaks up any standing waves and creates a multimode field within the furnace chamber, and a 6 kW microwave generator that provides microwaves to the chamber via waveguides.

In the present invention, densification is at least 50% and usually more than 75%. However, the process is capable of providing connecting rods having 90-100% densification.

All ranges provided herein include all the numbers within the range, as if specifically set forth.

While the invention has been described with respect to machining the large bore of the connecting rod, it will be appreciated that the latter may also be severed by cutting.

While the invention has been described in terms of preferred embodiments, the claims appended hereto are intended to encompass other embodiments which fall within the spirit of the invention.

What is claimed is:

1. A process of forming a remateable titanium powder base alloy connecting rod, the process comprising the steps of:
    (a) providing a body containing titanium powder base alloy, said powder base alloy having an average particle size of about 1-20 microns, a mean aspect ratio of about 5 to 300, and specific surface area of at least 25 m$^2$/g;
    (b) providing a mold for a connecting rod, said mold defining a connecting rod having a large bore therein for use as a large bearing and a small bore for use as a small bearing, said bores connected by an arm member;
    (c) adding said powder base alloy to said mold;
    (d) compressing said powder base alloy to form a preform;
    (e) sintering the preform; and
    (f) machining the perform along a plane in a wall defining said large bore to provide a cap portion having a machined surface which permit substantially exact rematching for securing said large bearing to a bearing surface of an engine crank.

2. The process in accordance with claim 1 wherein said sintering is performed in a temperature range of 1400° to 2200° F.

3. The process in accordance with claim 1 wherein said sintering is performed in a temperature range of 1500° to 2100° F.

4. The process in accordance with claim 1 wherein said body contains a non-metallic powder selected from the group consisting of silicon carbide, boron carbide, tungsten carbide, chromium carbide, alumina, zirconium oxide, silicon nitride, boron nitride, and titanium diboride.

5. The process in accordance with claim 1 wherein said body contains 5 to 70 parts non-metallic.

6. The process in accordance with claim 1 wherein said body contains organic binders.

7. The process in accordance with claim 1 wherein said body contains 5 to 40 parts non-metallic.

8. A process of forming a remateable, machined titanium powder base alloy connecting rod, the method comprising the steps of:
    (a) providing a body of a titanium powder base alloy comprised of Ti-6Al-4V, Ti-6Al-6V-2Sn, Ti-6Al-2Sn-4Zr-2Mo, Ti-10V-2Fe-3Al, and Ti-5Al-2.5Sn, said powder base alloy having an average particle size of about 1-20 microns, a mean aspect ratio of about 5 to 300, and specific surface area of at least about 25 m$^2$/g;
    (b) providing a mold for a connecting rod, said mold defining a connecting rod having a large bore therein for use as a large bearing and a small bore for use as a small bearing, said bores connected by an arm member;
    (c) adding said powder base alloy to said mold;
    (d) compressing said powder base alloy to form a preform;
    (e) sintering the preform to form a titanium connecting rod; and
    (f) machining a cap portion along a fracture plane in a wall defining said large bore to provide a cap portion with a surface for substantially exactly rematching to secure said large bearing to a bearing surface of an engine crank.

9. A titanium powder base alloy connecting rod for an internal combustion engine having a crank, said rod formed from a titanium powder base alloy having an average particle size of about 1-20 microns, a mean aspect ratio of about 5 to 300, and specific surface area of at least 25 m$^2$/g and said connecting rod having:
    (a) a large bore therein for use as a large bearing end and a small bore for use as a small bearing, the bores connected by an arm member to form said connecting rod;
    (b) a cap portion fractured along a fracture plane in a wall defining said large bore; and
    (c) machined surfaces provided on opposite ends of said cap portion and a second portion defining remainder of said large bore, said cap portion and said remainder having machined surfaces substantially exactly rematching for securing said large bearing to a bearing surface of a crank.

10. A titanium powder base alloy connecting rod in accordance with claim 9 wherein said rod has an elongation of not greater than 6%.

11. A titanium powder base alloy connecting rod for an internal combustion engine having a crank, the rod formed from a titanium powder base alloy comprised of Ti-6Al-4V, Ti-6Al-6V-2Sn, Ti-6Al-2Sn-4Zr-2Mo, Ti-10V-2Fe-3Al, and Ti-5Al-2.5Sn having an average particle size of about 1-20 microns, a mean aspect ratio of about 5 to 300, and specific surface area of at least 25 $m^2/g$, the rod comprising:

(a) a large bore therein for use as a large bearing end and a small bore for use as a small bearing, the bores connected by an arm member to form said connecting rod;

(b) a cap portion fracture along a fracture plane in a wall defining said large bore; and (c) machined surfaces provided on opposite ends of said cap portion and a second portion defining remainder of said large bore, said cap portion and said remainder having machined surfaces substantially exactly rematching for securing said large bearing to a bearing surface of a crank.

12. A rod in accordance with claim 11 wherein said rod has an elongation of not greater than 6%.

13. A rod in accordance with claim 11 wherein said connecting rod has an elongation in the range of 1 to 5%.

* * * * *